Dec. 23, 1969         R. C. CHURCHILL         3,485,465
SINGLE UNIT MAIN LANDING GEAR SYSTEM
Filed Nov. 21, 1967                    3 Sheets-Sheet 1

ROBERT C. CHURCHILL
*INVENTOR.*

BY Charles E. Woodward
ATTORNEY

Dec. 23, 1969 R. C. CHURCHILL 3,485,465

SINGLE UNIT MAIN LANDING GEAR SYSTEM

Filed Nov. 21, 1967 3 Sheets-Sheet 2

ROBERT C. CHURCHILL
*INVENTOR.*

BY *Charles E. Woodward*
ATTORNEY

ROBERT C. CHURCHILL
INVENTOR.

BY
ATTORNEY

United States Patent Office 3,485,465
Patented Dec. 23, 1969

3,485,465
SINGLE UNIT MAIN LANDING GEAR SYSTEM
Robert C. Churchill, Benbrook, Tex., assignor to General Dynamics Corporation, Fort Worth, Tex., a corporation of Delaware
Filed Nov. 21, 1967, Ser. No. 684,667
Int. Cl. B64c 25/16
U.S. Cl. 244—102          5 Claims

ABSTRACT OF THE DISCLOSURE

The combination of a main landing gear and speed brake, the gear being capable of absorbing high sink rate landing, exhibiting a low roll center, the extension and locking of the gear being aided by the forces, both aerodynamic and static, acting upon it, and which is fully retractable into a common wheel well by a relatively unsophisticated common extension and retraction mechanism, the main wheel well door being utilized as an aerodynamic speed brake.

---

The present invention relates generally to an aircraft alighting system comprising a novel composite speed brake and main landing gear assembly.

The inventive alighting system extends the capabilities of an aircraft to encompass high sink rate landings such as those engendered during operation from carrier decks or unimproved fields. This is due to the increased travel or stroke permitted each independently suspended segment of the main landing gear. The importance of this feature cannot be overlooked in view of the increased requirement in both military counter-insurgency type and commercial aircraft for increased loads and high performance, while using existing or minimal length runways.

The inventive gear is particularly adaptable to the new concept in multi-purpose aircraft since the gear is mounted in the fuselage, and therefore permits the full use of variable position wings as well as inherent fuselage strength. This adaptability is unique and permits the structural integrity of the fuselage to be preserved due to ability to maintain the structural continuity of the fuselage members, thus not compromising the high "g" maneuver capability of the aircraft and other characteristics. This is accomplished by the utilization of a single wheel well instead of the normal well for each gear. Additionally, both segments of the inventive landing gear may be retracted and extended by a single actuation mechanism, thereby greatly reducing the probability of landing gear retraction or extension failure and eliminating the possibility of landing with only one main wheel extended or locked.

In conjunction with the novel main landing gear and its associated wheel well, the wheel well door is utilized as an automatic aerodynamic speed brake, thus greatly enhancing the novel main landing gear and door composite.

The aircraft industry has been plagued for many years with problems associated with aircraft alighting systems. Reliability of the actuating systems for landing gears has been a major problem. In the event of failure of one of the gears to achieve the down and locked state, the pilot of an aircraft is forced to land with one gear extended and the other wholly or partially retracted. Chances of minimal damage to the aircraft, or in high performance aircraft even survival of the pilot, are greatly reduced in such circumstances due to the increased stress applied to the airframe generally, resulting in uncontrollability of the aircraft, metal-to-landing surface generated sparks, fuel cell ruptures and the consequent extremely high incidence of fire.

With the advent of supersonic aircraft another problem became apparent; inadvertent release of the landing gear during high speed flight. If inadvertent landing gear actuation occurs during high speed, particularly supersonic flight, the resultant aerodynamic stresses cause structural failure and subsequent loss of the main gears, and particularly when the gear attachment is to the wings, catastrophic primary structure failure. The prior art attempted to meet this problem by a compromise which inherently reduced the reliability of landing gear systems. This compromise involved pivoting the landing gear in such manner that they retract either toward the trailing edge of the wing or toward the centerline of the fuselage. This provision prevented the gear from sustaining a large aerodynamic load and possible structural damage upon inadvertent release from the stowed position. However, the compromise significantly reduced the safety of the system due to the direction of movement involved. In many instances a landing gear may partially extend but will not lock in position. With a landing gear in this condition, the compromise solution of the prior art is extremely detrimental in that contact with the ground during touchdown will inherently tend to force the gear to the retracted position promoting collapse of the gear. Furthermore, multiple actuators, pneudraulic lines, structural components and movable surfaces generally associated and requisite with these conventional systems result in a significant decrease in reliability. These multiple component systems result in an increased maintenance, probability of failure and overall weight which greatly effects the mission profiles of highly maneuverable supersonic aircraft.

The present invention overcomes each of these deleterious characteristics of prior landing gear systems by employment of a novel single unit main landing gear/ speed brake assembly. This feature greatly enhances reliability and results in a significant reduction in weight. The system of the invention utilizes only a single retraction/extension mechanism for both wheels. This obviously increases reliability and reduces maintenance. Additionally, in the event of actuator failure, both wheels will be in exactly the same relative position in the retraction or extension cycle, i.e., both fully down or both up, thus precluding the high structural loading engendered in emergency landings when one gear is up and one gear is down, as well as the instability in flight inherent in such condition. In addition to the above, the present novel system is retracted toward the forward portion of the aircraft. This causes the landing gear to inherently lock in the down position upon contact with the runaway surface in the event the locking was not accomplished during the normal extension cycle.

The main landing gear door is positioned forward of the gear itself, and thus is operable as a speed brake and is capable of shielding the main gear upon inadvertent actuation in flight due to the forward retraction of the gear. In the event of accidental release, the wheels in falling strike the door, forcing the door open to an equilibrium point where the downward weight of the gear is equalled by the upward aerodynamic pressure applied to the surface of the door by the slip stream. In this manner, the aircraft may reduce speed to a "safe" area before the wheels force the door fully open and subsequently drop out of the wheel well into that portion of the slip stream which is not masked by the door. Because of this cooperation, pressure on the wheels can never exceed design limits or be great enough to cause any structural damage to the gear or airframe.

The inventive system provides a roll center location that is more beneficial to ground maneuvering than existing known systems. The migration of the roll center is controlled so that very little aircraft sway is noticed during normal ground maneuvering. However, adequate sway is designed into the location of the roll center to warn the pilot if ground maneuvering threatens to cause the aircraft to turn over. Hence the novel landing gear is inherently stable and "forgiving."

Because of its unique geometric design, the landing gear is capable of abnormally long vertical wheel travel or stroke. This is extremely important in absorbing the loading generated by high sink rate landings, and particularly in operation from rough semi-improved surfaces. The long vertical stroke permits the graduated attenuation of the loads which reduces the stress upon structural components.

An object of the present invention is to provide a landing gear composite system having inherently greater reliability than state of the art devices, and yet one which is compatible with the demanding characteristics of modern multi-mission aircraft.

Another objective of the present invention is the provision of a landing gear system which satisfies the need for an intrinsically stable system occupying a single wheel well and is capable of attenuating high landing energies with low structural loads.

Other factors and attendant advantages will become apparent to those skilled in the art from the following specification when taken in conjunction with the drawings, wherein.

Figure 1:
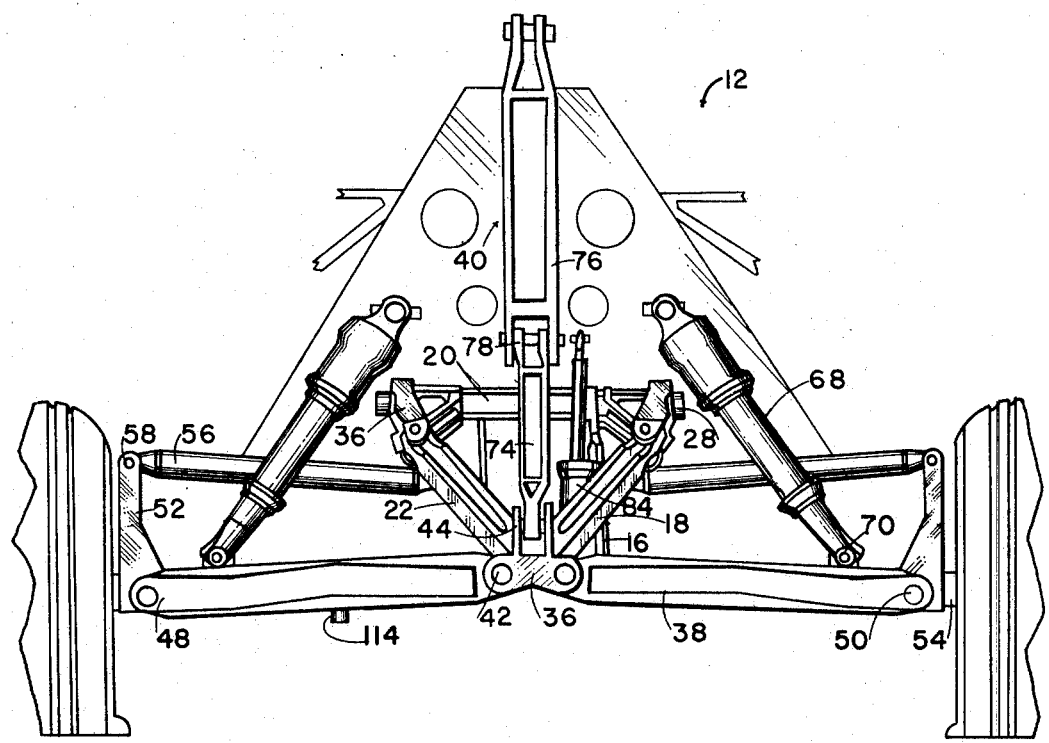
FIGURE 1 is a front elevational view of the landing gear of the invention showing major components.
Figure 2:
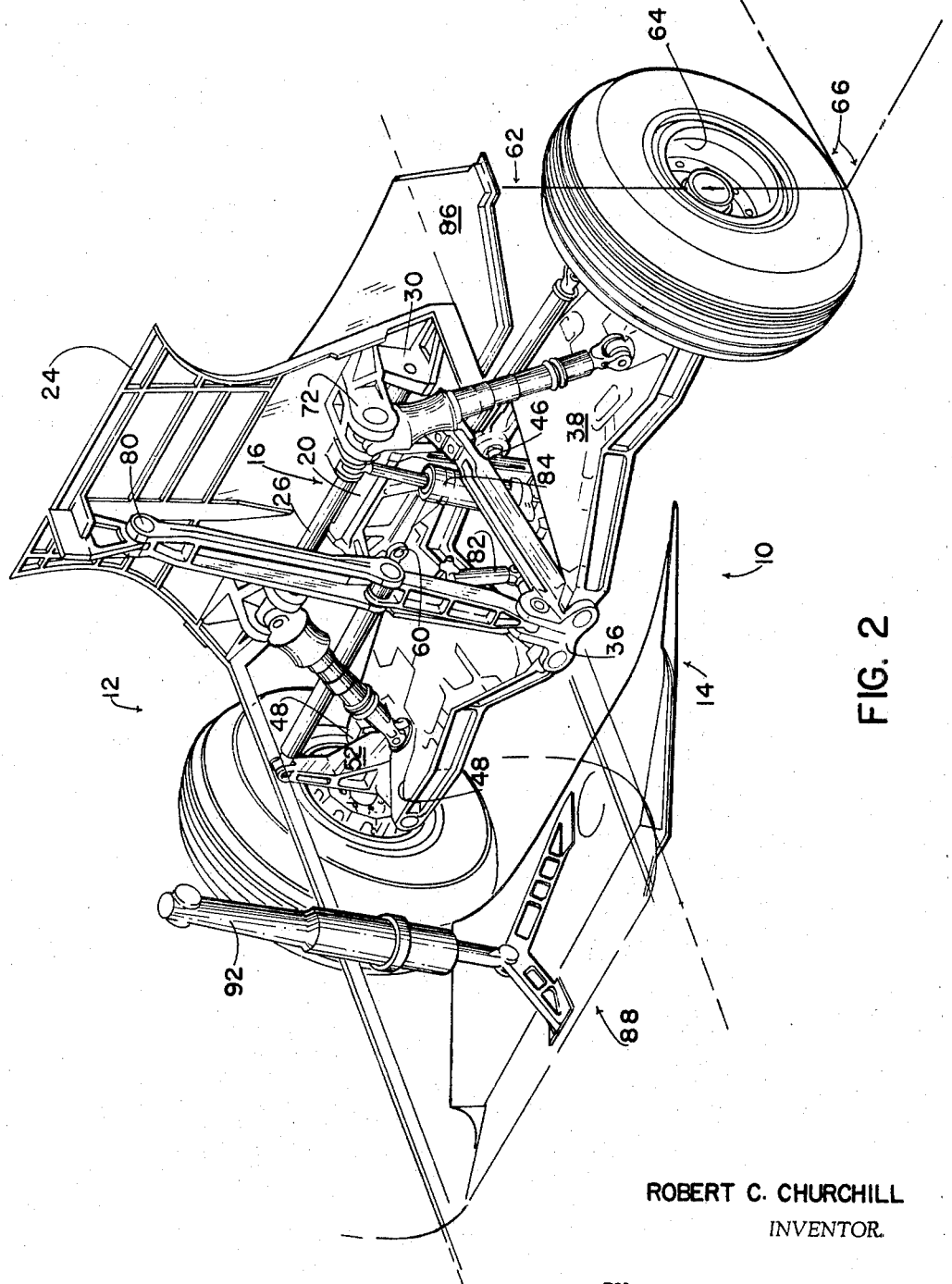
FIGURE 2 is an isometric view similar to FIGURE 1 but showing speed brake-landing gear system and detail relationships between components.

Having reference now to FIGURES 1 and 2, the system 10 of the invention (FIGURE 2) comprises gear assembly 12 and door assembly 14. Assembly 12 comprises a composite trunnion assembly 16 having "triangularly" arranged members 18, 20 and 22, attached to and supported by aircraft bulkhead 24 (FIGURE 2). In the extended position shown, trunnion assembly 16 is perpendicular to the plane of bulkhead 24. Trunnion assembly 16 includes a tubular bearing support 26 (FIGURE 2) into which trunnion pivot pin 28 is rotatably positioned. Mounting brackets 30 tie trunnion 16 to bulkhead 24 through pivot pin bearing supports 32 rotatably receiving pins 28, thus permitting trunnion 16 to swing through a 90 degree forward and downward arc relative to bulkhead 24. The base portion 20 of trunnion assembly 16 is attached to members 18, 22 by clevis 34, which are integral portions of and perpendicular to trunnion bearing support 26. Trunnion members 18 and 20 are joined through retaining members 36, which is a composite attachment means permitting articulated movement for the forward side of lateral beams 38 and drag brace 40 through pivot attachments 42 and 44. Base member 20 also includes a pivot attach point 46 for the aft side of lateral beam 38. In this manner the lateral beams 38 are, in effect, cantilevered with respect to common composite trunnion assembly 16 and are thus capable of swinging independently relative to each other and/or the trunnion about their attach points 42, 46 to thereby permit an articulated (arch like) motion at their forward extremities.

Lateral beams 38 have at their outer extremity bearing blocks 48 (FIGURE 2) which receive support pins 50 rotatably supporting axle assembly 52, into which axle 54 is journaled, and which also receives one end of stabilizer rod 56 at joint 58. Stabilizer rod 56 is rotatably attached at 60 at its opposite extremity to base portion 20 of common composite trunnion assembly 16.

As above described, a parallelogram-like structure has been formed by lateral beam members 38, axle assembly 52, stabilizer rod 56, and finally the phantom plane (not shown) that lies between the joint 60 of stabilizer rod 56, trunnion assembly 16 and the axial center of rotation established by pivot at the trunnion/lateral beam joint 42. Substantially the same perpendicular relationship is maintained between centerline 62 positioned vertically through wheel 64 and plane 66 representing the alighting surface, due to the relation between the lateral beam 38 and the upper control stabilizer arm 56. This planar relationship will exist regardless of the relative position of either lateral beam to ground plane 66 or to each other. Two stage shock struts 68 are rotatably attached to each lateral beam 38 by lugs and clevises 70, while their opposite extremities are rotatably attached as at 72 to bulkhead 14.

Retraction of the main landing gear assembly 10 is accomplished by means of composite drag brace 40 conisting of lower strut 74 and upper strut 76, articulated at 78. The lower extremity of drag strut 74 is pivotally attached to trunnion assembly retaining members 36, while the upper extremity of the drag strut is rotatably attached at 80 to bulkhead 24. Drag brace 40 is "broken" towards trunnion base portion 20 when retracting the gear by downlock pneudraulic actuator 82. Actuator 82 is pivotally attached to retaining member 36 on the trunnion and at its other extremity to lower drag brace 74 of composite drag brace 40. Retraction of the main gear assembly is accomplished by retraction actuator 84 which is suitably rotatably attached to bulkhead 24 and to trunnion assembly 16, thereby allowing trunnion assembly 16 to be drawn toward bulkhead 24 in an arc.

The wheel well doors comprise a forward speed brake door 14 and an aft door 86. Door 14 is pivotally attached at hinge line 88 (FIGURE 3) to the aircraft fuselage 90. Forward speed brake door 14 is cycled through the closed, extended and trailing positions by pneudraulic actuating cylinder 92 which is rotatably attached to door fitting 94. The opposite (fixed) extremity of cylinder 92 is rotatably fixed within the aircraft structure. The aft main landing gear door 86 and its mechanism (not shown) is attached to and pivots about main landing gear trunnion assembly 16. Rods, 96, 98 are located between the door mechanism and aft wheel well bulkhead 24 maintaining the aft door in an attitude parallel to the aircraft contour and slightly aft of the main gear 12 in the extended condition. Therefore, as the gear is retracted, door 86 is brought forward parallel to the lower surface of the aircraft and is subsequently seated into the fully closed position.

Figure 3:
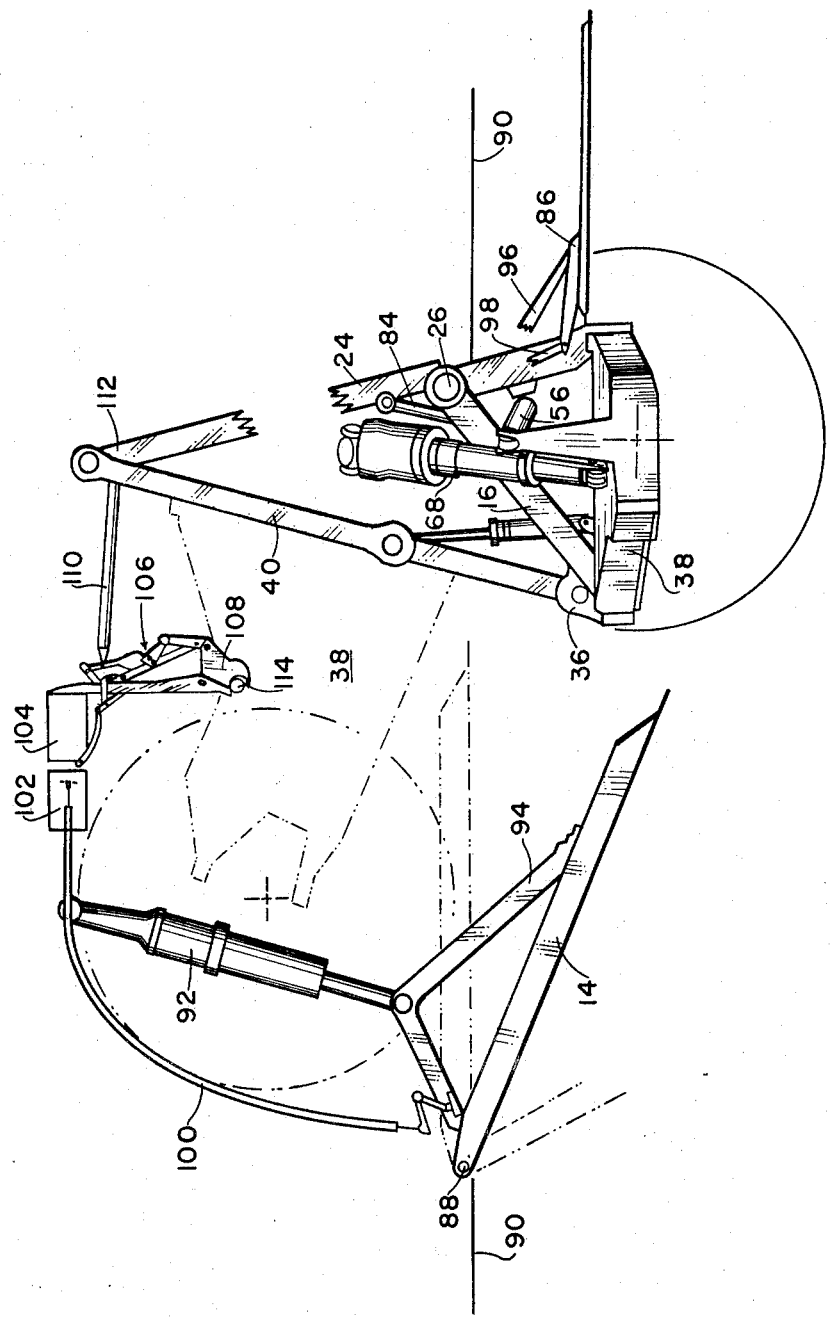
FIGURE 3 is a side, elevational view of the speed brake/landing gear assembly showing the operative relationship of the combination.

FIGURE 3 shows the speed brake door-landing gear relationship in the extended position in full line and retracted in broken line. Speed brake door 14 is mechanically coupled through door position control line 100 to landing gear select valve 102 and speed brake select valve 104, which are connected through the linkage 106 to uplock assembly 108, and through appropriate means, such as landing gear position control rod 110 and retract actuator rod 112 to retract actuator 84 and downlock actuator 82.

The extension-retraction cycle is best illustrated by reference to FIGURES 1 and 3. Beginning with the extension cycle, extension is initiated by the pilot by moving the control handle to the "gear down" position. This causes the utility system hydraulic pressure, through appropriate valves (not shown) to route hydraulic pressure to speed brake door actuator 92, moving door 14 to the full open position. Door position control rod 100 at this point, through landing gear select valve 102 and linkage 106, causes uplock 108 to rotate away from lock roller 114, releasing landing gear 12 and permitting it to extend by gravity. The wheels travel an arcuate, downward path until shock struts 68 reach their full stroke, whereupon trunnion assembly 16 forces lateral beams 38 to spread apart, causing the wheels to extend laterally until drag brace 40 reaches its centerline position, where it is maintained locked by downlock actuator 82, acting responsive to landing gear select valve 102. Following locking, hydraulic pressure is automatically routed, by speed brake select valve 104, to door actuator 92, causing it to return to the trail position shown in full line in FIGURE 3. Once the landing gear is locked down and the speed brake is in the trail position, the hydraulic sytsem will by-pass speed brake select valve 104, speed brake door 14 then being responsive only to initiation of the retraction cycle of the landing gear 12, that is, the speed brake door cannot be operated through the speed brake system.

Initiation of the "retraction" cycle (following removal of the load from the "squat switches," not shown, which are state of the art devices) operates speed brake select valve 104 (through suitable valve means not shown) to route hydraulic pressure from the utility system to speed brake door actuator 92, opening speed brake door 14 to the "full" open position from the trail. At the full open position responsive to "gear up," door position control rod 100 causes landing gear select valve 102 to positively rotate uplock 108, assuring that uplock 108 is open, and also causes downlock actuator 82 to draw drag brace knee joint 78 "in," enabling retraction actuator 84 to rotate trunnion 16 upwardly into the wheel well about pivot 26. This upward rotation also causes lateral beams 38 to swing together at their outboard extremities about retaining member 36. The wheel assembly 12, now folded—the wheels together, continues up and forward into the wheel well, partially compressing shock struts 68, until uplock 108 engages uplock roler 114. On engagement of uplock 108, hydraulic pressure is automatically routed through speed brake select valve 104 to actuator 92, causing door 14 to come to the "close" position. Once in this position, speed brake is independently actuatable through valve 104 by the "speed brake" controls, and is automatically operable in conjunction with the gear assembly 12 on actuation of "gear down" controls.

I claim:
1. A landing gear stowable in a common wheel well by a common retraction-extension mechanism, comprising:
    (A) trunnion means fixed to the aircraft structure for pivotal arcuate movement downward and forward therefrom, said means including a first frame member which in the gear extended configuration lies substantially parallel to a transverse, vertical plane passing through the aircraft fuselage, and a second frame member which in the gear extended position is at substantially right angles to said first member and extends forward therefrom;
    (B) a pair of beam members substantially horizontally disposed in the gear extended, landed configuration, each beam member having an inner side with aft and forward ends, and an outer side with at least an outer end, each beam member pivotally fixed to said first frame member at their inner aft ends and to said second frame member at their inner forward ends;
    (C) means connected to the outer ends of said beam members operative to retain wheel members in a plane substantially normal to said beams when in the gear down configuration;
    (D) means operative to cause said beam members and said first and second frame members to pivot about the fixed portion of said trunnion means; and
    (E) brace means interposed between the aircraft structure and the forward end of said second frame member at the point of forward attachment to said beam members.

2. The gear defined in claim 1 wherein:
    (A) said second frame member comprises a triangular frame pivotally attached to the aircraft structure at the junction of said first and second frame members;
    (B) said wheel retaining means comprises vertically extended axle assemblies pivotally attached to said beams and to a stabilizer rod, said rod pivotally attached to said first frame member;
    (C) a shock strut interposed between said beam members and the aircraft structure operative to cause said beam members to spread laterally at their outer ends on extension of the gear;
    (D) locking means operatively connected between said brace means and said trunnion means to lock or unlock said brace means responsive to actuation of said trunnion means; and
    (E) means operative to actuate retraction of said trunnion means and beam members.

3. A landing gear assembly for retraction into a common wheel well comprising the combination of a speed brake wheel well cover selectively automatically responsive to actuation of a landing gear, comprising:
    (A) a door hinged to the aircraft structure for pivotal actuation thereof forwardly and downwardly and automatically responsive to actuation of the landing gear control;
    (B) means responsive to door position actuating a landing gear locking means and retraction means whereby the landing gear remains in the uplocked or downlocked position pending release thereof by said door responsive means;
    (C) gear means collapsible inwardly and rotatable upwardly; and
    (D) means responsive to said door position responsive means operative to collapse inwardly and rotate upwardly said gear means.

4. The combination defined by claim 3 wherein:
    (A) said door is responsive independently to speed brake controls in the gear up configuration, and automatically responsive only to landing gear controls in the gear down configuration or an actuation of landing gear controls in the gear up configuration, comprising:
        (1) a speed brake select valve independently operable and responsive to landing gear actuation to cause said door to move downwardly to the full open position pending locking of the landing gear;
        (2) door position control means actuated at the full open door position to actuate a gear retraction-extension cycle;
        (3) a landing gear select valve responsive to said door position control means;
        (4) linkage means responsive to said landing gear select valve operative to lock and unlock the landing gear;
    (B) said landing gear comprising:
        (1) a trunnion fixed to the aircraft structure for pivotal arcuate movement comprising
            (a) a first frame member;
            (b) a second frame member at an acute angle to said first frame member;
        (2) beam members pivotally fixed to said first and second frame members; and
        (3) gear retraction means attached at one end to said beam members and at the other end to the aircraft structure and responsive to said landing gear select valve.

5. A landing gear stowable in a common wheel well by a common retraction-extension mechanism, comprising:
    (A) trunnion means fixed to the aircraft structure for pivotal arcuate movement downward and forward therefrom, said means including a first frame member which in the gear extended configuration lies substantially parallel to a transverse, vertical plane passing through the aircraft fuselage, and a second frame member which in the gear extended position is at substantially right angles to said first member and extends forward therefrom;
    (B) a pair of beam members, each beam member having an inner side with aft and forward ends, and an outer side with at least an outer end, each beam member pivotally fixed to said first frame member at their inner aft ends and to said second frame member at their inner forward ends;

(C) means connected to the outer ends of said beam members operative to retain wheel members in a substantially vertical plane when in the gear down and landed configuration;

(D) means operative to cause said beam members and said first and second frame members to pivot about the fixed portion of said trunnion means; and (E) brace means interposed between the aircraft structure and the forward end of said second frame member at the point of forward attachment to said beam members.

References Cited

UNITED STATES PATENTS

| | | | |
|---|---|---|---|
| 2,659,555 | 11/1953 | Schlender | 244—102 |
| 3,073,548 | 1/1963 | Marsh | 244—12 |
| 3,198,461 | 8/1965 | Beach | 244—102 |

FOREIGN PATENTS

| | | |
|---|---|---|
| 625,360 | 8/1961 | Canada. |
| 837,759 | 11/1938 | France. |

MILTON BUCHLER, Primary Examiner

P. E. SAUBERER, Assistant Examiner